(12) United States Patent
Bussiere et al.

(10) Patent No.: US 7,287,252 B2
(45) Date of Patent: Oct. 23, 2007

(54) UNIVERSAL CLIENT AND CONSUMER

(75) Inventors: Gregory A. Bussiere, Portsmuth, RI (US); Rother V. Hodges, Wakefield, RI (US); Robert J. Pallack, Jr., Westport, MA (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 698 days.

(21) Appl. No.: 10/263,295

(22) Filed: Sep. 27, 2002

(65) Prior Publication Data

US 2004/0064820 A1  Apr. 1, 2004

(51) Int. Cl.
*G06F 9/445* (2006.01)

(52) U.S. Cl. ............... 717/176; 717/174; 717/177; 709/217; 709/219; 709/230; 715/700; 715/736

(58) Field of Classification Search ........... 715/700, 715/736; 719/316; 709/223–328, 217, 219, 709/230; 717/174, 176, 177, 2–109
See application file for complete search history.

(56) References Cited

U.S. PATENT DOCUMENTS

| 5,920,718 | A | * | 7/1999 | Uczekaj et al. | 717/109 |
| 6,330,600 | B1 | * | 12/2001 | Matchefts et al. | 709/223 |
| 6,374,308 | B1 | * | 4/2002 | Kempf et al. | 719/316 |
| 2001/0052113 | A1 | * | 12/2001 | Hearne et al. | 717/2 |
| 2002/0099818 | A1 | * | 7/2002 | Russell et al. | 709/224 |
| 2003/0093551 | A1 | * | 5/2003 | Taylor et al. | 709/237 |
| 2003/0236925 | A1 | * | 12/2003 | Balek et al. | 709/328 |

* cited by examiner

*Primary Examiner*—Meng-Al T. An
*Assistant Examiner*—Mark P. Francis
(74) *Attorney, Agent, or Firm*—James M. Kasischke; Jean-Paul A. Nasser; Michael P. Stanley (57) ABSTRACT

In a network computing environment with a distributed software system utilizing Common Object Request Broker Architecture (CORBA), a Universal Client and Consumer tool that creates Client and Consumer implementations for use in interacting with any existing Servers and/or Suppliers in the system, and displaying the data resulting from the interactions for the purpose of validating the operation, functionality and performance of the Servers and Suppliers. The tool creates a graphical user interface for the user to select Servers or Suppliers to evaluate. The tool identifies the Server or Supplier IDL interface, and then creates either a Client or Consumer Implementation that uses the same corresponding IDL interface. The tool then attempts to connect to the Server or Supplier and where appropriate allow the user to invoke methods. Data received from the Servers and/or Suppliers is displayed on a video device and logged for later analysis.

1 Claim, 10 Drawing Sheets

FIG. 9

UNIVERSAL CLIENT AND CONSUMER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates in general to distributed software systems, and more specifically to a method and apparatus for creating Client and Consumer Implementations in a Common Object Request Broker Architecture (CORBA) based distributed software system where the Client and Consumer Implementations interact with any existing Servers and/or Suppliers/event channels (Suppliers) in the system, and display the data resulting from the interactions for the purpose of validating the operation, functionality and performance of the Servers and Suppliers.

(2) Description of the Prior Art

A common data processing system design utilizes a distributed computing environment where data is managed and disseminated over two or more interconnected computers. Such an interconnection of computers with the ability to communicate information between the computers is known as a computer network, or simply a network. Such networks may include a large number of components, including various types of computers and peripheral devices, which may be configured in a variety of ways and may be characterized as "Local Area Networks" (LANs) or "Wide Area Networks" (WANs) based on the geographic area over which the components are distributed. LANs and WANs often employ standard common configurations or architectures. For example, in a standard Client/Server configuration a certain number of the interconnected computers may function as Clients while others may function as Servers that provide services to the Clients. Such a Client/Server configuration is a common example of one of the several available configurations of distributed computing environments (LANs and WANs) and is well known by those skilled in the art.

One manner of implementing software applications to run on a LAN or WAN is to use a vendor-independent network software architecture and infrastructure that various heterogeneous software applications can use to work together over the network. Such an implementation can be achieved using the "Common Object Request Broker Architecture" (CORBA) Specification. CORBA is a vendor independent specification for an architecture and infrastructure that promotes interoperability within a distributed software system. It integrates computers from different vendors ranging in size from mainframes to desktops. CORBA provides a software bus that enables system applications to exchange and communicate information where such applications typically are distributed across a LAN or WAN. A CORBA based system relies on data abstraction to permit software applications running on the system to function unconstrained by the underlying network details, such as the types of workstations, the types of operating systems, and/or the languages of other application implementations. One of CORBA's most important, as well as most frequent uses is in Servers that must handle a large number of Clients, at high hit rates with high reliability. Applications utilizing the CORBA infrastructure are typically implemented and configured as either providers of data (Servers and Suppliers) or users of data (Clients and Consumers). Reference to either Client or Consumer hereinafter will be understood to also include the other term unless specified otherwise.

A large-scale distributed software system utilizing CORBA based architecture may have hundreds or even thousands of Servers and/or Suppliers. Development of such a large-scale distributed software system would ideally involve incremental integration of the system on a network. During this sort of integration the operations of the Servers and Suppliers need to be validated before the Clients and Consumers are installed on to the system. If the operations of the Servers and Suppliers are determined to be in error, the system will require debugging before integration can continue. During incremental integration, developers need to verify the initialization of Servers and Suppliers as well as connectivity and data interactions between the Servers/Suppliers and Clients/Consumers. They need to take relevant performance measurements such as the time to initialize, the time required for Servers to respond to Client invocations and the frequency rate of Suppliers providing data. They also need to verify that data obtained from the Servers and Suppliers is within specified ranges.

Although software tools presently exist for gathering a variety of data from Servers and/or Suppliers in a distributed software system, they do not employ existing CORBA resources to achieve their results in real time, rather they often require additional performance monitoring code to be incorporated into each Server/Supplier application.

There currently does not exist a method and apparatus that can non-intrusively assist a software developer in validating the operations of and debugging any of the Servers and Suppliers in a CORBA based system during incremental integration of the system that avoids incorporating performance-monitoring code into each Server/Supplier application.

What is needed is a Universal Client and Consumer software tool that rather than incorporating additional code exploits existing CORBA resources for the purpose of validating the operation, functionality and performance of any of the Servers and Suppliers in a CORBA based distributed software system.

SUMMARY OF THE INVENTION

It is a general purpose and object of the present invention to provide a method and apparatus that allows a network user to examine any single Server, any single Supplier, or any logical combination of Servers and/or Suppliers in a CORBA based software system for the purpose of validating the operation, functionality and performance of the chosen Servers and/or Suppliers.

It is a further object that the user be able to choose which particular Servers and/or Suppliers to examine by means of a graphical user interface (GUI) that displays a list of all of the Servers and Suppliers in the CORBA based system on a network video terminal connection.

It is still a further object that the GUI allows the user to issue commands to perform functions such as connect or disconnect to a specific Server or Supplier, display data, and record data.

It is yet a further object that the GUI includes a display of the actual raw data obtained from a particular Server or Supplier.

Another object is that the user be able to take measurements of timing details, data range and similar performance metrics pertaining to the Servers and Suppliers in the system.

Still another object is to provide storage of connection status information, operational status information, and raw data obtained from a particular Server or Supplier periodically in a data store for long-term statistical analysis.

These objects are accomplished with the present invention through a method and apparatus that evaluates and assimilates all of the CORBA Interface Definition Language (IDL) interfaces for Servers and Suppliers in a distributed software system and then creates corresponding Client or Consumer Implementations to interact with them. The method and apparatus creates and controls one or more Client or Consumer Implementations specific to a corresponding Server or Supplier that the user is seeking to validate. Each Client or Consumer Implementation attempts to connect to the appropriate Server or Supplier across the CORBA software bus. The success or failure of the connection is made available to the user, as is the time required to establish a connection when one is made. The Client or Consumer Implementation interacts with the corresponding Server or Supplier, invoking methods or receiving data. The Client or Consumer Implementation can then verify and measure the received data and pass the data to the GUI for the user to observe, or to a data store to be recorded. For the purposes of this invention, Suppliers are considered to include the implementation of the standard Object Management Group (OMG) CORBA Object Services (COS) Event Service. The term Supplier includes the terms producer/event channel.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

In all figures, identical components within the system carry identical numerals and letters. However, if a component in one figure is represented in other figures by various components, then different marking are used to denote each component not shown in the one figure.

DESCRIPTION OF THE PREFERRED EMBODIMENT

Figure 1:
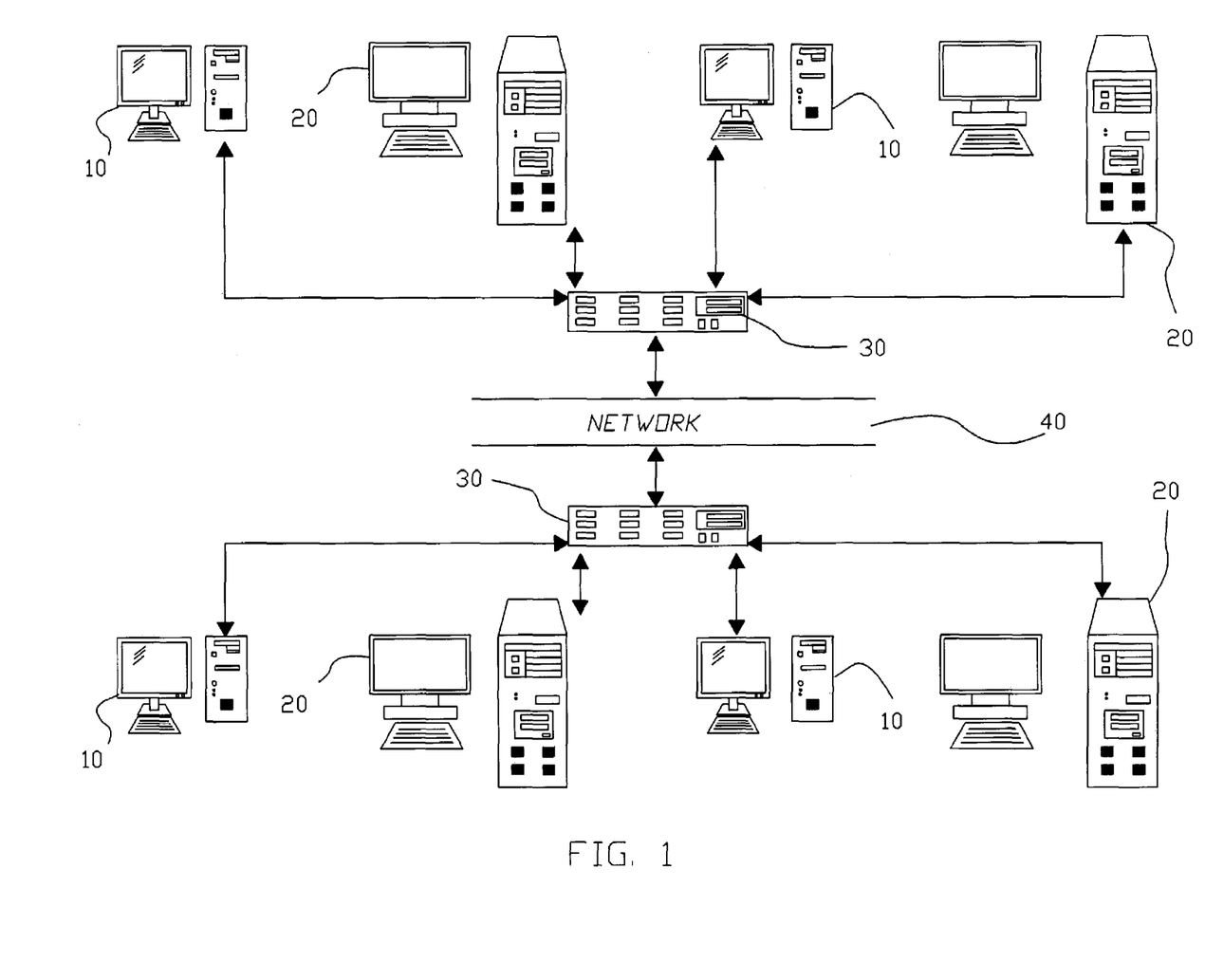
FIG. 1 shows a schematic diagram depicting a typical Client-Server Consumer-Supplier network.

The present invention is designed for use in a Client-Server Consumer-Supplier network such as the one depicted in FIG. 1. Referring now to FIG. 1 there is shown one or more Client/Consumer computers 10, one or more Server/Supplier computers 20, each connected to a network hub 30. One or more network hubs 30 are in turn connected to the rest of the network 40. Note that at times a Server/Supplier computer 20 may also function as a Client/Consumer computer 10, or that more than one Server/Supplier application may be running on a Server/Supplier computer 20. The Clients/Consumers 10 request services or data from the Servers/Suppliers 20. The requests and responses to the requests are implemented using resources found in an object oriented software architecture that implements an object request broker and an interface definition language under certain defined protocols such as CORBA resources.

Figure 2:
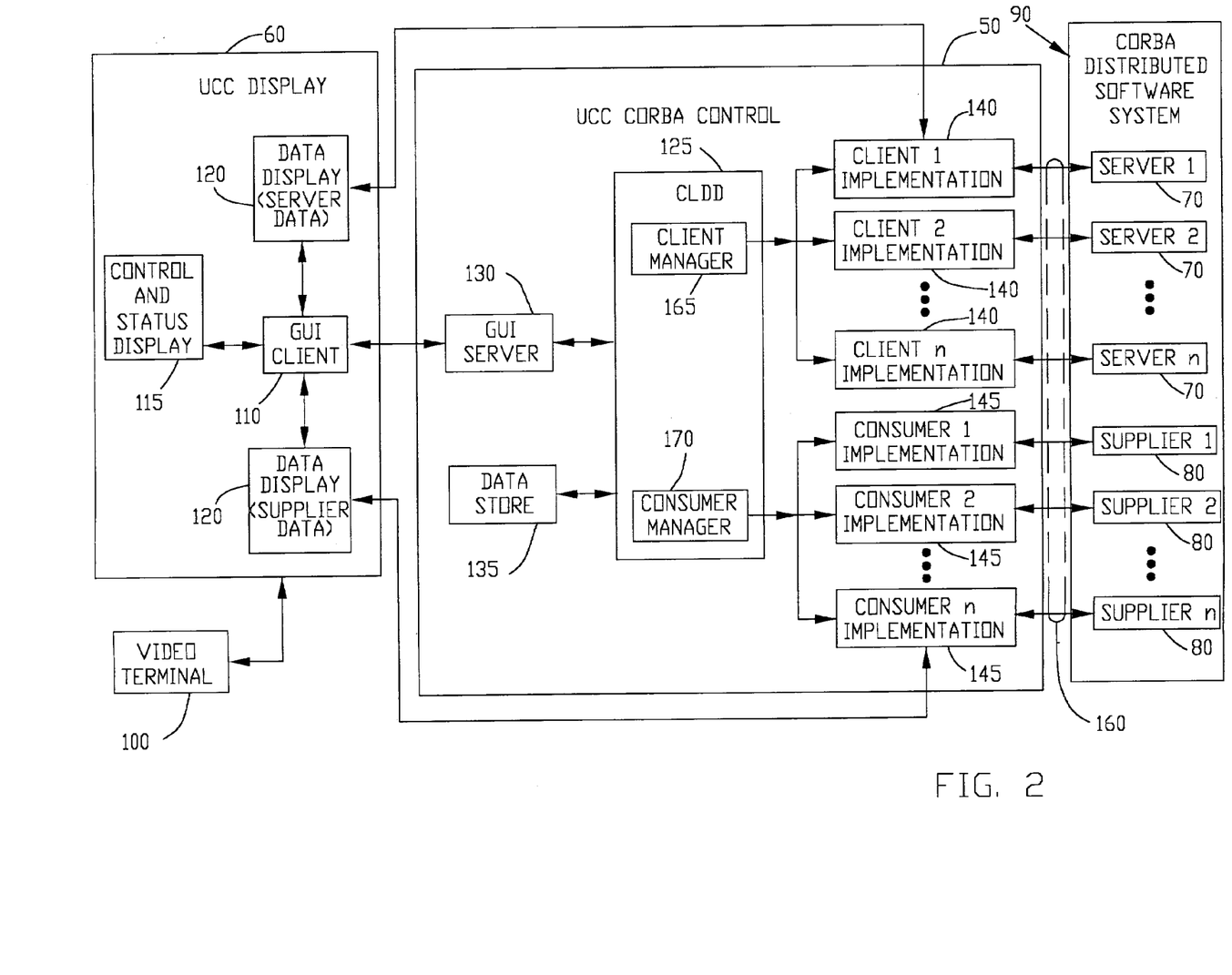
FIG. 2 shows a block diagram of the UCC that illustrates its constituent parts and connections.

The Universal Client and Consumer (UCC) as illustrated in the block diagram in FIG. 2 includes two main components; the UCC CORBA Control 50, and the UCC Display 60. The UCC CORBA Control 50 establishes the actual connections to the CORBA Server processes (Servers) 70 and Supplier processes (Suppliers) 80 in the CORBA distributed software system 90. In addition, it manages those connections and stores statistics and information on the connections. The statistics and information are displayed by the UCC Display 60 in a graphical format on video terminal 100. The UCC Display 60 includes a GUI Client 110 that creates and maintains a control and status display 115 and data displays 120. The UCC CORBA Control 50 further comprises the Control Logic/Data Distribution module (CLDD) 125, the GUI Server 130, the Data Store 135, and the Specific IDL Client and Consumer Implementations 140, 145.

Figure 3:
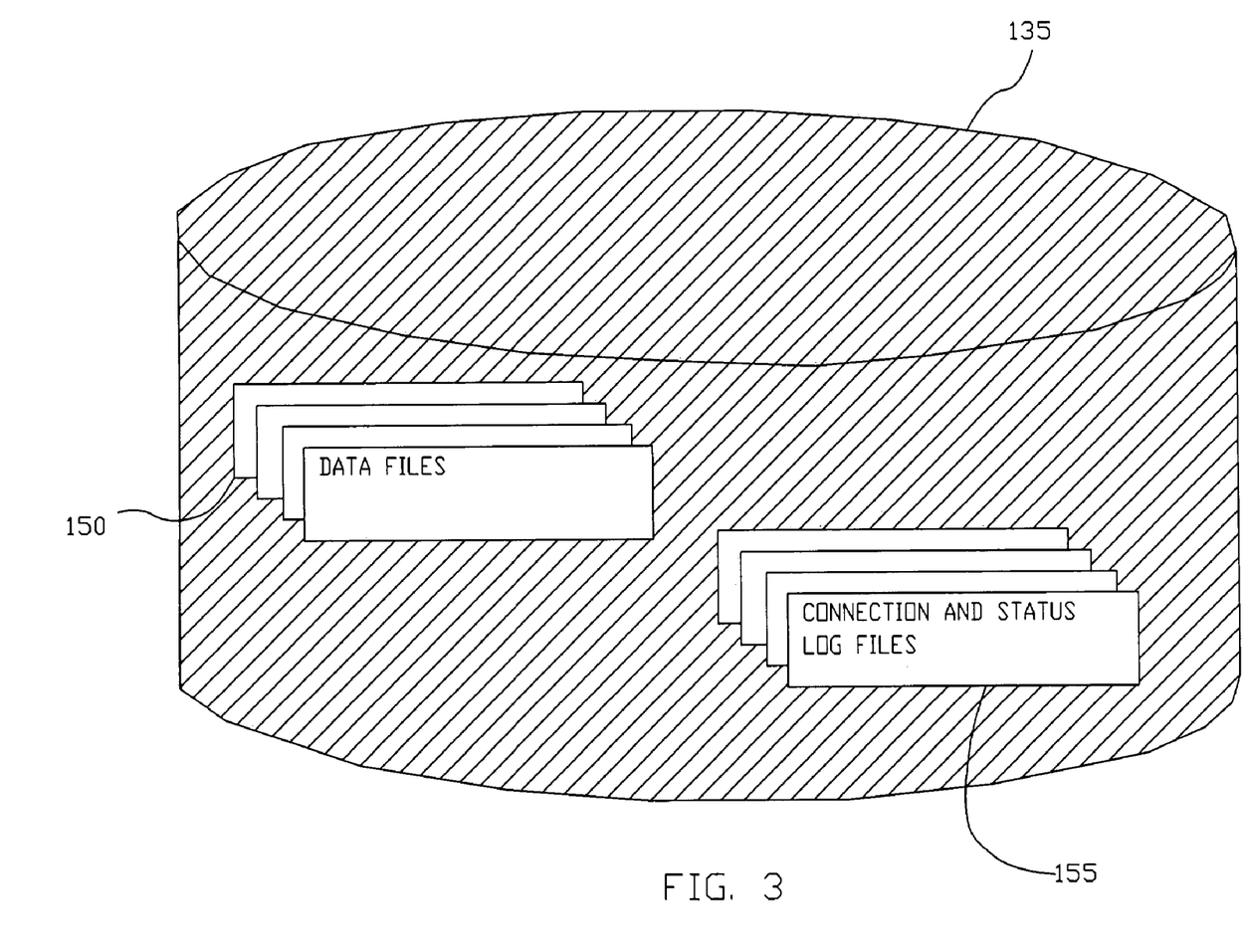
FIG. 3 shows a schematic diagram of the Data Store.

The Data Store 135, depicted in FIG. 3, is a permanent magnetic or optical storage medium in which to store and retrieve data files 150 generated by Servers and Suppliers, and the connection and status log files 155 which represent the status of connections between the Implementations and data sources. In a preferred embodiment of the invention, Data Store 135 is a series of files or a database stored on a hard disk. The contents of the Data Store can be stored over extended periods of time and used for long-term statistical analysis.

The CLDD 125 controls the creation and deletion of specific Client and Consumer Implementations 140, 145, and provides status from the Data Store 135 as necessary to respond to user control requests. The GUI Server Interface 130, which contains a CORBA IDL interface implemented by the UCC CORBA Control 50, passes control data (i.e., commands entered by the user) and status data between UCC Display 60 and UCC CORBA Control 50. The CLDD 125 receives commands and parameters entered by the user through the GUI Server 130 and performs functions associated with these commands.

The Specific IDL Client and Consumer Implementations 140, 145 portion of the UCC CORBA Control consists of one or more implementations of classes employing the same specific IDL interfaces of the system 90. The UCC is configured to operate with the same specific IDL interfaces employed by the system 90 it is interacting with. Therefore, in order to configure the UCC to work with a particular system 90, the UCC is designed with a class for each one of the IDL interfaces in that system 90. The implementation of these classes is specific to the system 90. The UCC dynamically creates specific instantiations of the Implementations when it seeks to interact with a particular data source in the system 90. An Implementation is referred to as a Client Implementation 140 if the specific IDL interface it employs allows it to connect to a Server 70. Similarly, an Implementation is referred to as a Consumer Implementation 145 if the specific IDL interface it employs allows it to connect to a Supplier 80. The Client or Consumer Implementations correspond to any desired set of IDL interfaces as defined by the IDL of the particular system 90 that the UCC is configured to work with.

Figure 4:
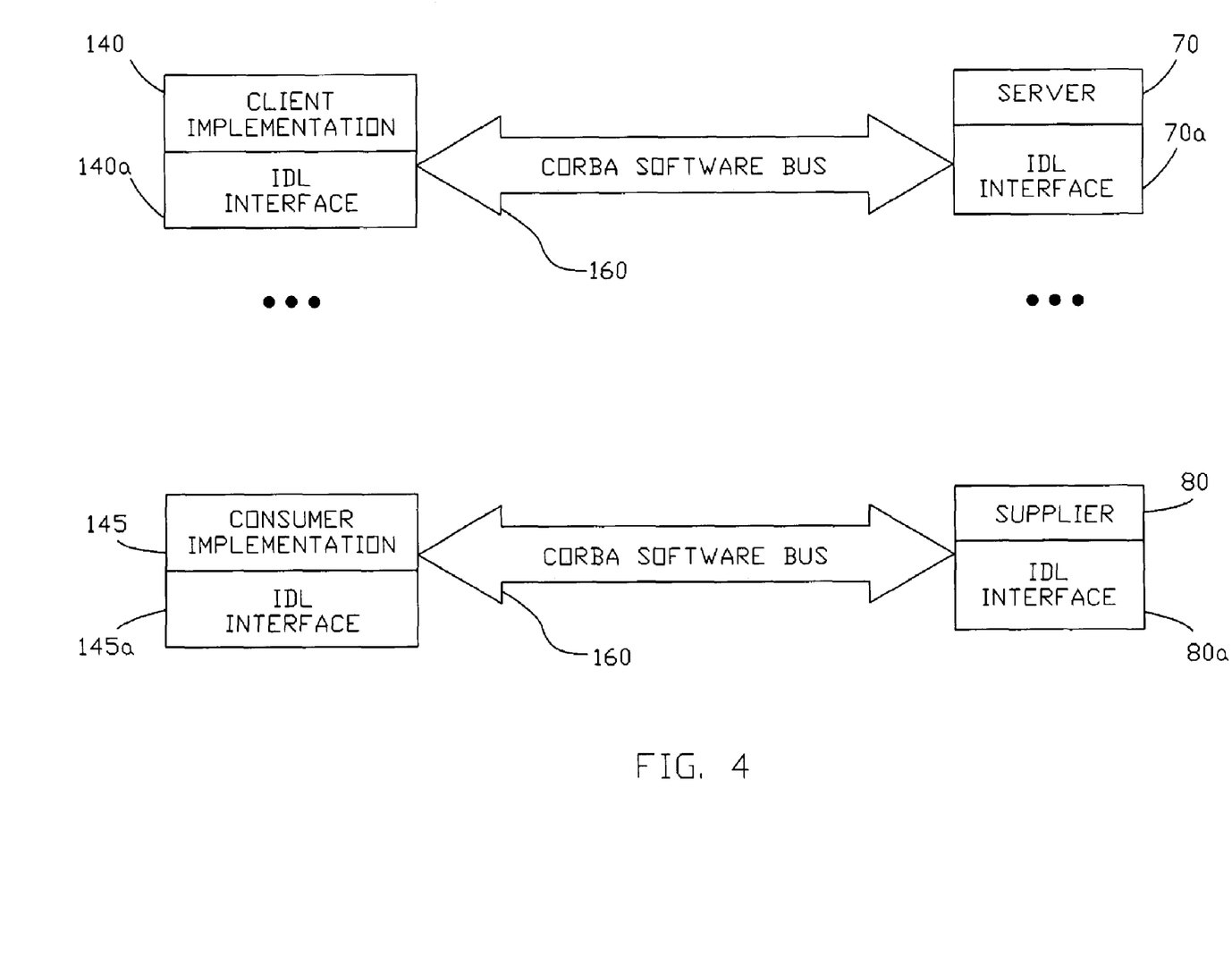
FIG. 4 shows a schematic diagram of distributed software applications or processes implemented on a CORBA based network system.

FIG. 4 illustrates a typical Client Implementation 140 or Consumer Implementation 145 invoking services or requesting data across the CORBA software bus 160 through its respective IDL interface 140*a* or 145*a*. Each Server 70 or Supplier 80 has a corresponding IDL interface 70*a* and 80*a* respectively. In order to access a Server 70 or Supplier 80, the Client Implementation 140 or Consumer Implementation 145 must have a matching or corresponding interface 140*a* or 145*a*. The Client Implementation 140 performs invocations on the Server 70 and responses proceed across the CORBA software bus 160 back to the invoking Client Implementation 140. In the case of a Consumer Implementation 145, after the Consumer registers for events as required by CORBA, the Consumer Implementation 145 receives invocations provided by the Supplier 80. Invocations from Suppliers are also called events.

As stated above, the CLDD 125 performs functions associated with user commands. Referring to the block diagrams of FIG. 2 and FIG. 5, User commands and parameters are directed to one of two manager components of the CLDD 125. The Client Manager 165 handles any interactions with the Servers 70 in the system 90 and the Consumer Manager 170 handles the interactions with the Suppliers 80 in the system 90. The Client Manager 165 creates, controls, and deletes the Client Implementations 140 as requested by the user. The Consumer Manager 170 creates, connects, controls, and deletes the Consumer Implementations 145 as requested by the user.

Figure 5:
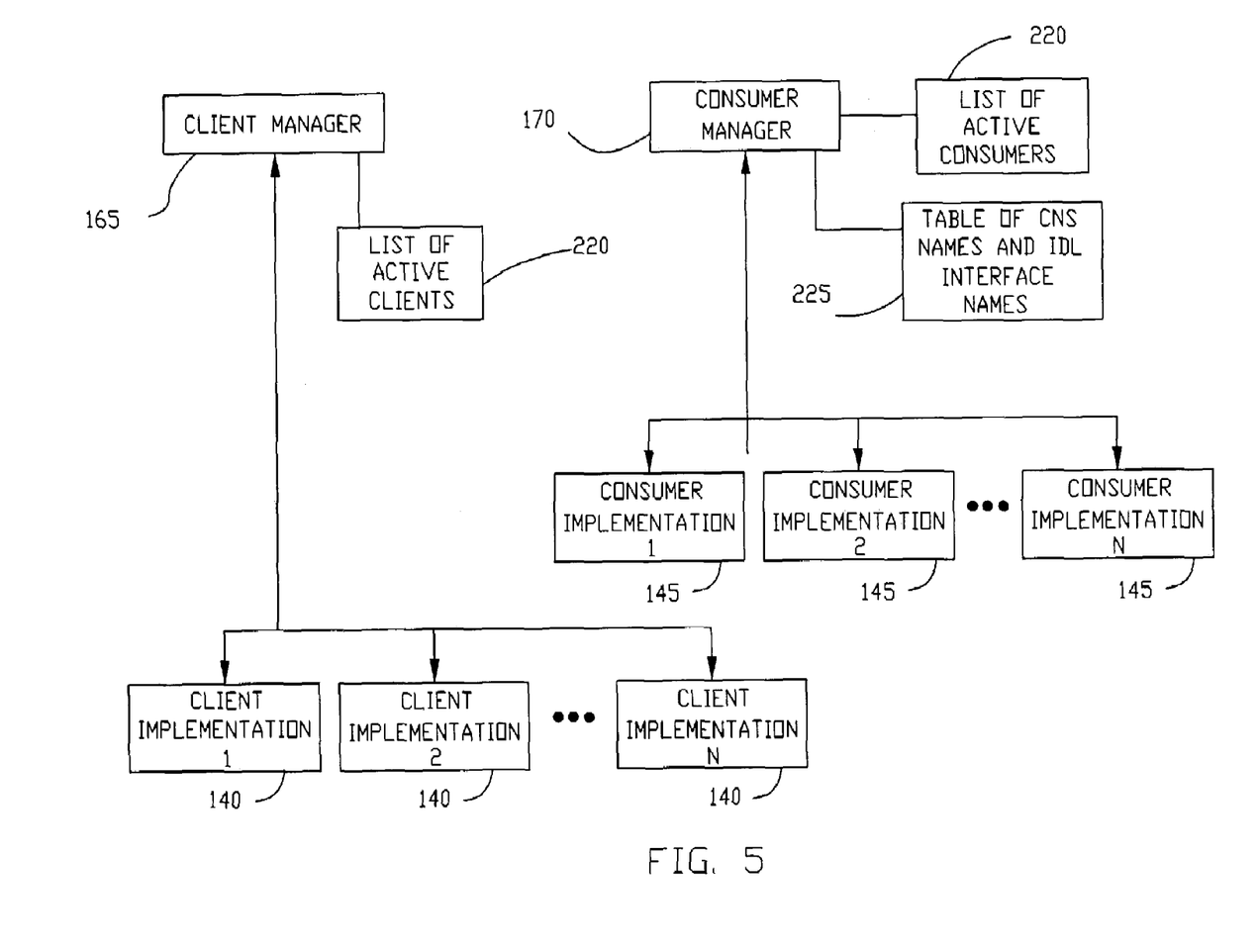
FIG. 5 shows a block diagram of the Client Manager, Consumer Manager, and Client and Consumer Implementations.

The CLDD handles the following user requests through the appropriate Managers: requests to connect to a Server or Supplier, requests to disconnect from a Server or Supplier, requests for specific Implementations to display their data, requests for timing details (this is latency data for events), requests to see connection status logs (i.e, logs of which Servers or Suppliers are connected and which attempted connections were successful), requests to reset statistics (i.e., clear statistics on a particular Interface), and request data statistics from a particular Implementation.

Figure 6:
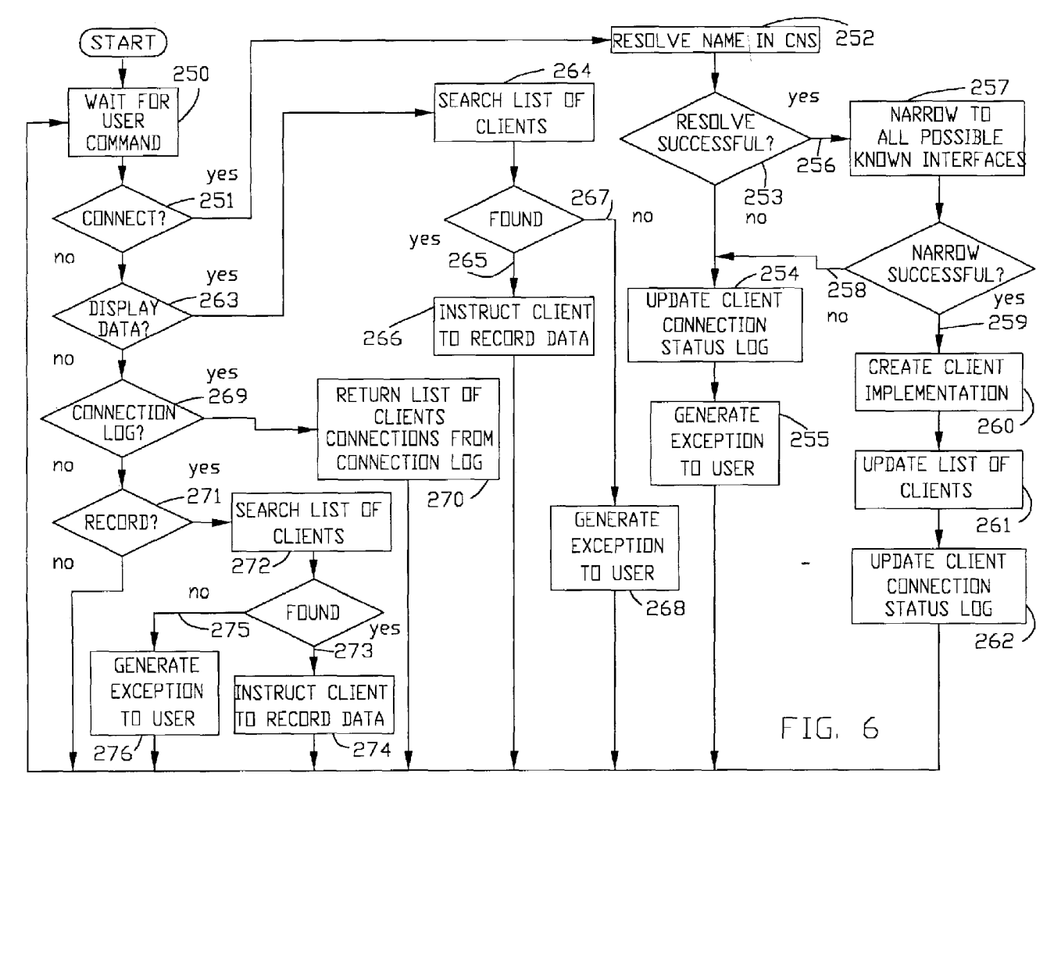
FIG. 6 shows the flow diagram for the Client Manager.

The Client Manager flow diagram is shown in FIG. 6. The Client Manager is in charge of dynamically creating, controlling and deleting Client Implementations 140 as requested by the user. The Client Manager keeps track of all of the Implementations 140 it dynamically creates in a List of Clients 220 that it maintains in random access memory. The Client Manager can receive a CONNECT, DISPLAY DATA, CONNECTION LOG or a RECORD DATA command from the user.

Referring to the first step, as shown in FIG. 6, the Client Manager 165 waits to receive a user command 250 from the GUI Server 130. Receipt of the CONNECT command 251, from the user by the Client Manager 165 indicates that the user wishes to connect to a particular Server 70 in the system. The Client Manager 165 is provided with the CORBA Name Server (CNS) name of the particular Server 70. In the next step, the Client Manager 165 performs a CORBA resolve 252 on the CNS name. If the resolve is not successful 253, the Client Connection and Status Log 155 is updated on the Data Store 120 to note the resolve failure 254. The Manager 165 generates an exception to notify the user of the failure 255 and the Manager 165 awaits another user command 251. If the resolve is successful 256, then in the next step, the Client Manager 165 attempts a CORBA narrow 257 to all of the IDL interfaces in the system 90. If the narrow is not successful 258, the Client Connection and Status Log 155 is updated on the Data Store 120 to note the narrow failure 254. The manager 165 then generates an exception to notify the user of the failure 255 and the Manager 165 awaits another user command 250. If the narrow succeeds 259, then the Client Manager 165 creates 260 a new Client Implementation 140 that employs the specific IDL Interface needed to connect with the Server 70 of interest to the user. The Client Implementation 140 is then passed the Server Object obtained from the CORBA Name Service (not shown). The Client Manager 165 updates its List of Clients 261, and then notes the successful connection in the Client Connection and Status Log file 155 in the Data Store 262. The Manager 165 then waits for another user command 250.

When the Client Manager 165 receives a DISPLAY DATA command from the user 263, it searches for the requested Client Implementation 140 in the List of Clients 264. If the Manager 165 finds the Client Implementation 140 in the list 265, then it instructs the Client Implementation 140 to display the data it is receiving from the Server 70 it is connected to 266. If the Manager 165 fails 267 to find the Client Implementation 140, then it notifies the user of the error 268 and waits for another command 250.

When the Client Manager 165 receives a CONNECTION LOG command from the user 269, it obtains the Client Connection and Status Logs 155 of all of the Client Implementations 140 from the Data Store 120 and returns that information back to the user through the GUI 270. The Manager then waits for another command 250.

When the Client Manager 165 receives a RECORD DATA command from the user 271, it searches for the requested Client Implementation 140 in its List of Clients 272. If the Manager 165 finds the Client Implementation 140 in the list 273, then it instructs that Client Implementation 140 to record the data 274 it is receiving from the Server 70 it is connected to. If the Manager 165 fails 275 to find the Client Implementation 140, then it notifies the user of the error 276 and waits for another command 250.

In accordance with standard CORBA requirements in order for each specific Client Implementation 140 created by the Client Manager to connect with a specific Server 70 of interest to the user both the Client Implementation 140 and the Server 70 must employ the same specific IDL interface. Each Client Implementation 140 created by the Client Manager 165 performs the same standard functions plus specific functions as defined by that IDL interface necessary to interact with the Server 70 of interest to the User. There can be as many different Client Implementations 140 as there are IDL interfaces in the system 90. The Client Manager 165 creates the Client Implementations 140 dynamically whenever the user chooses to connect to a Server 70.

Figure 7:
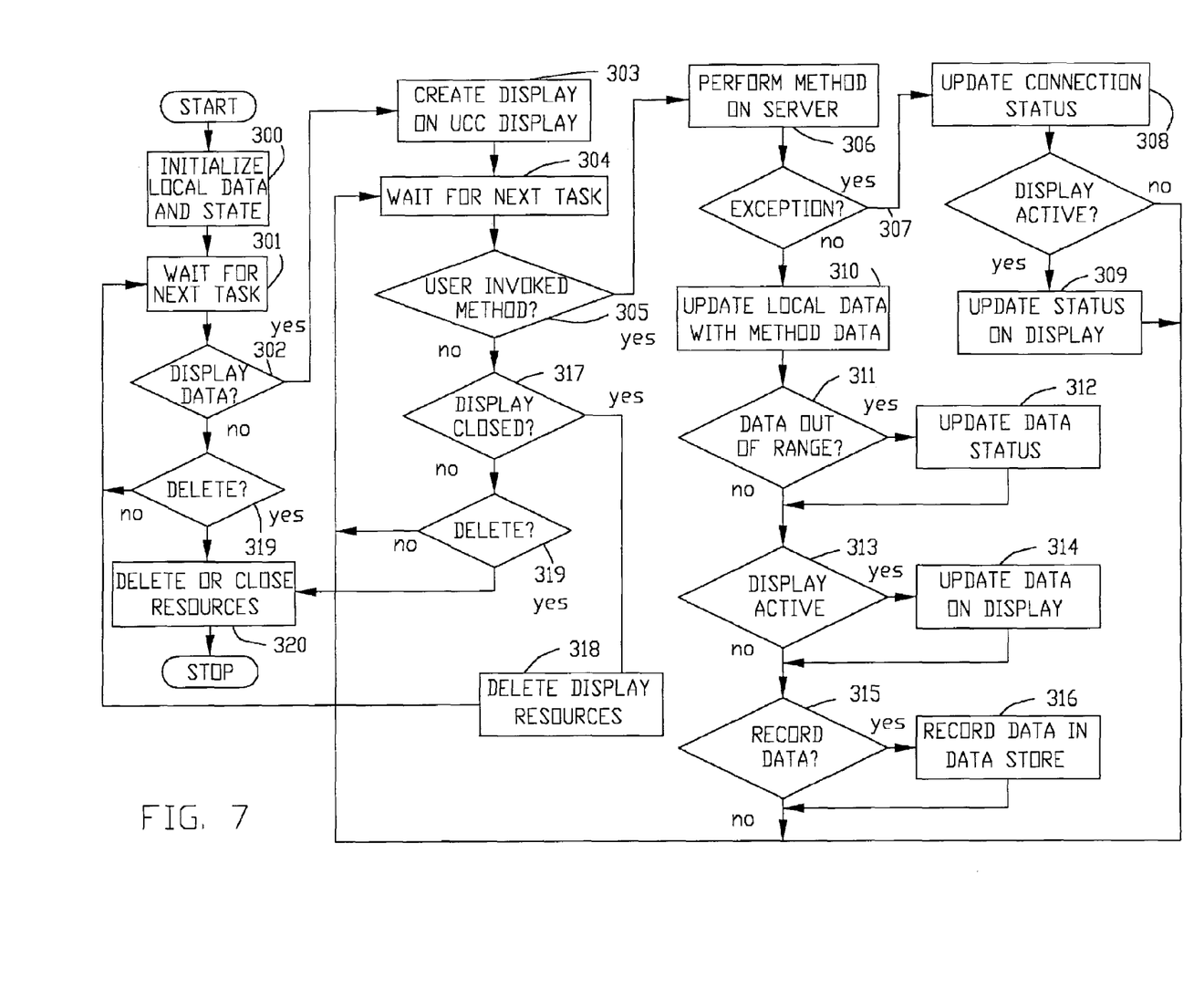
FIG. 7 shows the flow diagram for a Client Implementation.

Each Client Implementation 140 has the same flow diagram as shown in FIG. 7. In the first step 300, the Client Implementation 140 initializes local data and state essentially clearing its local data store (not shown). Each Client Implementation maintains its own local data store in random access memory that keeps track of the Client's connection status and contains the data received by the Client from the Server it is interacting with.

The Client Implementation 140 then waits to perform a task 301. Upon receiving instructions from the Client Manager 165 to DISPLAY DATA 302, the Client Implementation 140 creates 303 a data display 120 on the UCC Display 60. In a preferred embodiment of the invention, when the user enters a DISPLAY DATA command, the Client Implementation 140 provides a MOTIF™ window on the GUI Display for the user. From this window, the user can interact with the Server 70 and invoke any of the available methods specific to the particular Server's IDL interface that the Client Implementation 140 is interacting with. Once the display 120 is created, the Client Implementation 140 waits to receive instructions for its next task 304.

Upon receiving a USER-INVOKED METHOD 305, the Client Implementation 140 performs the method on the Server 70 it is interacting with 306. If the Client Implementation 140 is unable to successfully perform the method, then an exception is generated 307. The Client Implementation 140 updates its connection status 308, and if the display is still active updates the connection status 309 on the UCC Display 60. In a preferred embodiment, if the Client Implementation 140 is not able to perform a successful invocation, then the connection status is updated in the Client's local data store and if the MOTIF™ window is active the error is indicated at the bottom of the window so that the user is informed of the exception or error condition.

If the Client Implementation 140 is able to successfully perform the method as invoked by the user, then its next step is to update its local data store with the method data it receives 310 from the Server 70. In one embodiment, the Client Implementation 140 could then accesses a System Configuration files (not shown) and compares the method data with the standard range for that particular data. If the Client Implementation 140 determines that the data is out of range 311 then the determination is noted in the local data store as data status 312. If the display is active 313, the new data is displayed 314 in the UCC Display 60.

The user has the option of instructing the Client Implementation 140 to record all of the data in its local data store in random access memory to a file in the Data Store 120. Where this option is active 315, the data is formatted and saved to the Data Store 120 in step 316.

When the user enters a DISPLAY CLOSED command 317 the Client Implementation 140 destroys the MOTIF™ window that contains data display 120 window and recovers all resources used to create it 318.

When the user enters a DELETE command 319 the Client Implementation 140 deletes or closes all resources and terminates 320.

Figures 8, 8B:
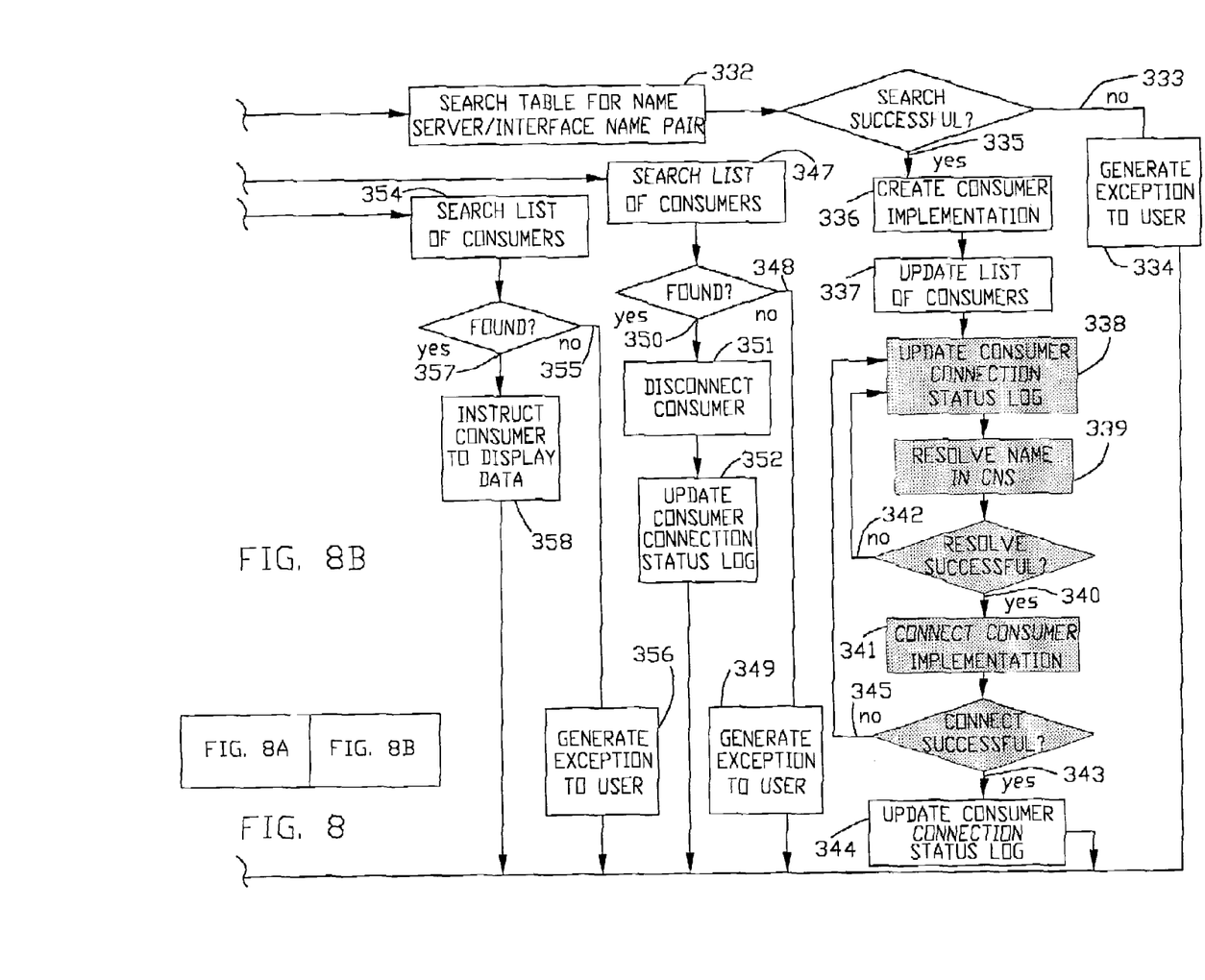
FIG. 8 shows the flow diagram for the Consumer Manager.
Figure 8A:
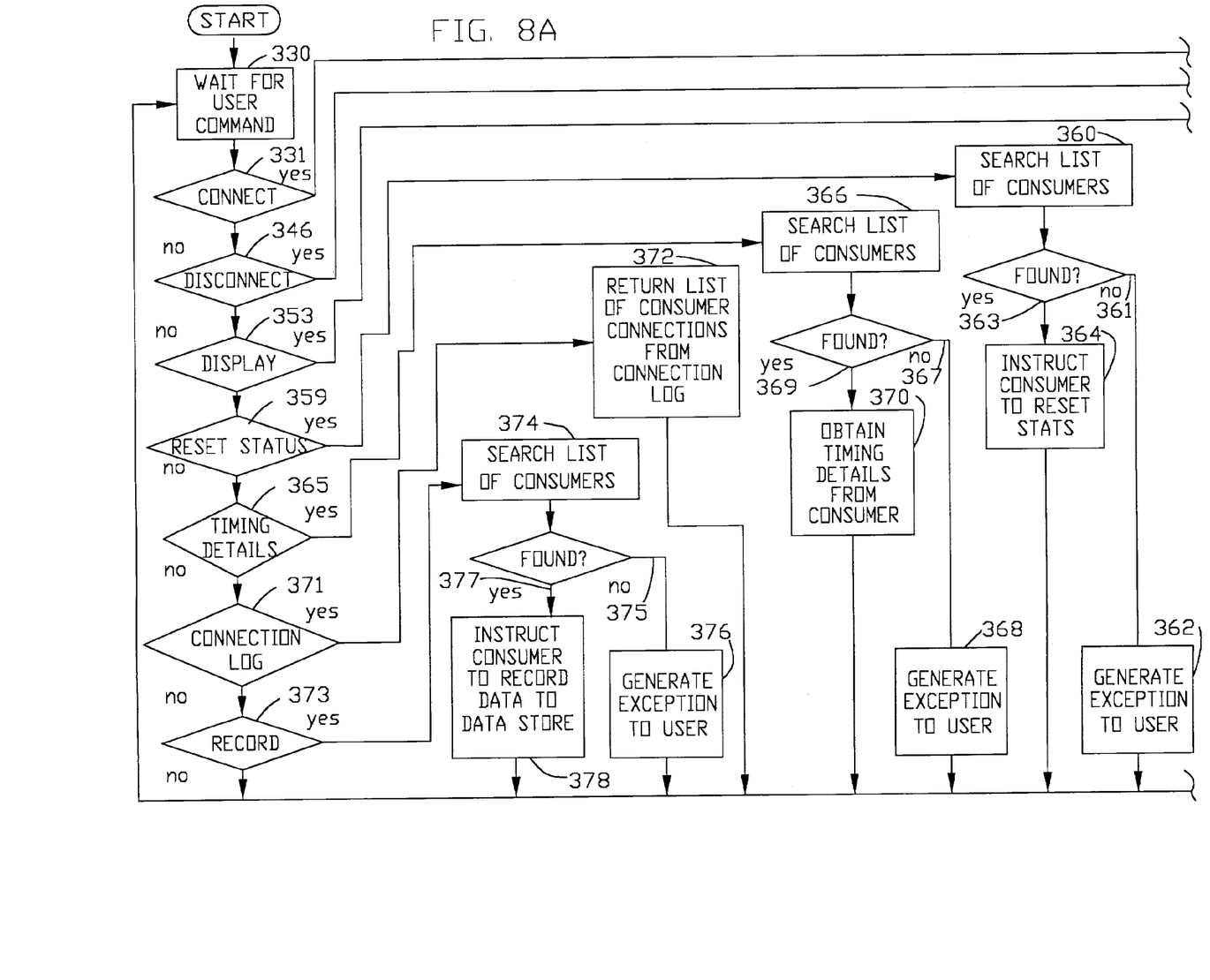

The Consumer Manager 170 is in charge of dynamically creating, controlling and deleting Consumer Implementations 145 as requested by the user. The Consumer Manager 170 keeps track of all of the Implementations 145 that it dynamically creates in a List of Consumers 220 that it maintains in random access memory. The Consumer Manager 170 also maintains a Table of Name Server Names and IDL Interface Names 225 in the form of a text file. The Names are specific to the system 90 that the UCC is configured to interact with. The Consumer Manager 170 responds to the following user commands: CONNECT, DISCONNECT, DISPLAY DATA, RESET STATISTICS, TIMING DETAILS, CONNECTION LOG or RECORD DATA.

The Consumer Manager 170 flow diagram is shown in FIG. 8. In the first step, the Consumer Manager 170 waits to receive a user command 330 from the GUI Server 130. If the Consumer Manager receives a CONNECT command 331 from the user it attempts to connect to a Supplier 80 in the system designated by the user. The CNS name of the Supplier 80 is provided to the Consumer Manager 170 as part of the connect command. In the next step 332, the Consumer Manager 170 cross-references the CNS name with an interface name in the Table of Name Server Names and IDL Interface Names 225. Cross-referencing is needed to identify the specific Supplier 80 that the User wishes to connect to. If the Consumer Manager 170 cannot find the desired Supplier 80 interface name 333 it generates an exception and passes it to the GUI Server 130 to display the error to the user 334 and waits for another command 330. If it finds the desired Supplier 80 interface name 335, then it creates 336 a Consumer Implementation 145 that employs the appropriate IDL Interface to connect to the Supplier 80. The Consumer Manager 170 then updates 337 its List of Consumers 220 to include this new Consumer Implementation and the Consumer Connection and Status Log 155 is set to "CONNECTING" 338. The Consumer Manager 170 then performs a CORBA resolve on the CNS Name 339. If the resolve is successful 340, then the Consumer Manager 170 attempts to connect 341 the Consumer Interface 145 to the user designated Supplier 80. If the resolve is not successful 342, the Consumer Manager 170 updates the Consumer Connection and Status Log 155 to "NAME NOT FOUND" 338 and attempts a resolve again 339. If the Consumer Manager 170 is successful in connecting 343 the Consumer Implementation 145 and the Supplier 80, it updates 344 the Consumer Connection and Status Log 155 status to "CONNECTED" and then waits for the next user command 330. If the Consumer Manager 170 is not successful in connecting 345 the Consumer Implementation 145 and the Supplier 80, it updates the Consumer Connection and Status Log 155 at step 338 and repeats steps 339 to 340 until a successful connection is made. In order to provide continuous service in the event of an unsuccessful resolve or connection, the Consumer Manager 170 attempts to connect all of the Consumer Implementations 145 in parallel. All of the steps in FIG. 8 that are done in parallel are shaded.

If the Consumer Manager 170 receives a DISCONNECT command from the user 346, the Consumer Manager 170 searches 347 its List of Consumers 220 to see if the user designated Consumer Implementation 145 is active. If it is not 348 the Consumer Manager 170 generates an exception and passes it to the GUI Server 130 to display the error to the user 349. The Manager 170 then waits for another command 330. If the Manager 170 finds the Consumer Implementation 145 on the list 350, it disconnects 351 the Consumer Implementation 145 from the Supplier 80, and updates 352 the Consumer Connection and Status Log 155. The Manager 170 then waits for another command 330.

If the Consumer Manager 170 receives a DISPLAY DATA command from the user 353, the Consumer Manager 170 searches its List of Consumers 220 to see if the user designated Consumer Implementation 145 is active 354. If it is not 355 the Consumer Manager 170 generates an exception and passes it to the GUI Server 130 to display the error to the user 356. The Manager 170 then waits for another command 330. If the Manager 170 finds the Consumer Implementation 145 on the list 357, it instructs the Consumer Implementation 145 to display the data 358 it is receiving from the Supplier 80 on to the UCC Display 60. In a preferred embodiment of the invention, the Consumer Implementation 145 provides a MOTIF™ window on the GUI Display to display data for the user. The Manager 170 then waits for another command 330.

If the Consumer Manager 170 receives a RESET STATISTICS command 359, from the user, the Consumer Manager 170 searches its List of Consumers 220 to see if the user designated Consumer Implementation 145 is active 360. If it is not 361 the Consumer Manager 170 generates an exception and passes it to the GUI Server 60 to display the error to the user 362. If the Manager 170 finds the Consumer Implementation 145 on the list 363, it instructs the Consumer Implementation 145 to clear its Local Data and Statistics in memory 364 and then waits for the next user command 330.

If the Consumer Manager 170 receives a TIMING DETAILS command 365, from the user, the Consumer Manager 170 searches its List of Consumers 220 to see if the user designated Consumer Implementation 145 is active 366. If it is not 367 the Consumer Manager 170 generates an exception and passes it to the GUI Server 130 to display the error to the user 368. If the Manager 170 finds the Consumer Implementation 145 on the list 369, it obtains the timing details (e.g. whether data is being received from the Supplier at the required periodicity) from that Consumer Implementation 370 and then waits for the next user command 330.

If the Consumer Manager 170 receives a CONNECTION LOG command 371, it obtains the Connection and Status Logs 155 of all the Consumer Implementations 145 it has created. The Connection and Status Logs 155 are maintained in the Data Store 120. The Consumer Manager 170 then displays 372 the connection log information to the user on the UCC Display 60 and then waits for the next user command 330.

If the Consumer Manager 170 receives a RECORD DATA command 373, from the user, the Consumer Manager 170 searches its List of Consumers 220 to see if the user designated Consumer Implementation 145 is active 374. If it is not 375 the Consumer Manager 170 generates an exception and passes it to the GUI Server 130 to display the error to the user 376. If the Manager 170 finds 377 the Consumer Implementation 145 on the list 220, it instructs that Consumer Implementation 145 to record the Local Data and Statistics information it is maintaining in its memory to the Data Store 378 and then waits for the next user command 330.

In accordance with standard CORBA requirements in order for each specific Consumer Implementation 145 created by the Consumer Manager 170 to connect with a specific Supplier 80 of interest to the User both the Consumer Implementation 145 and the Supplier 80 must employ the same specific IDL interface. Each Consumer Implementation 145 created by the Consumer Manager 170 performs the same standard functions plus specific functions as defined by that IDL interface necessary to interact with the Supplier 80 of interest to the User. There can be as many Consumer Implementations 145 as there are IDL interfaces in the system 90. The Consumer Manager 170 creates the Consumer Implementations 145 dynamically whenever the user chooses to connect to a Supplier 80.

Figure 9:
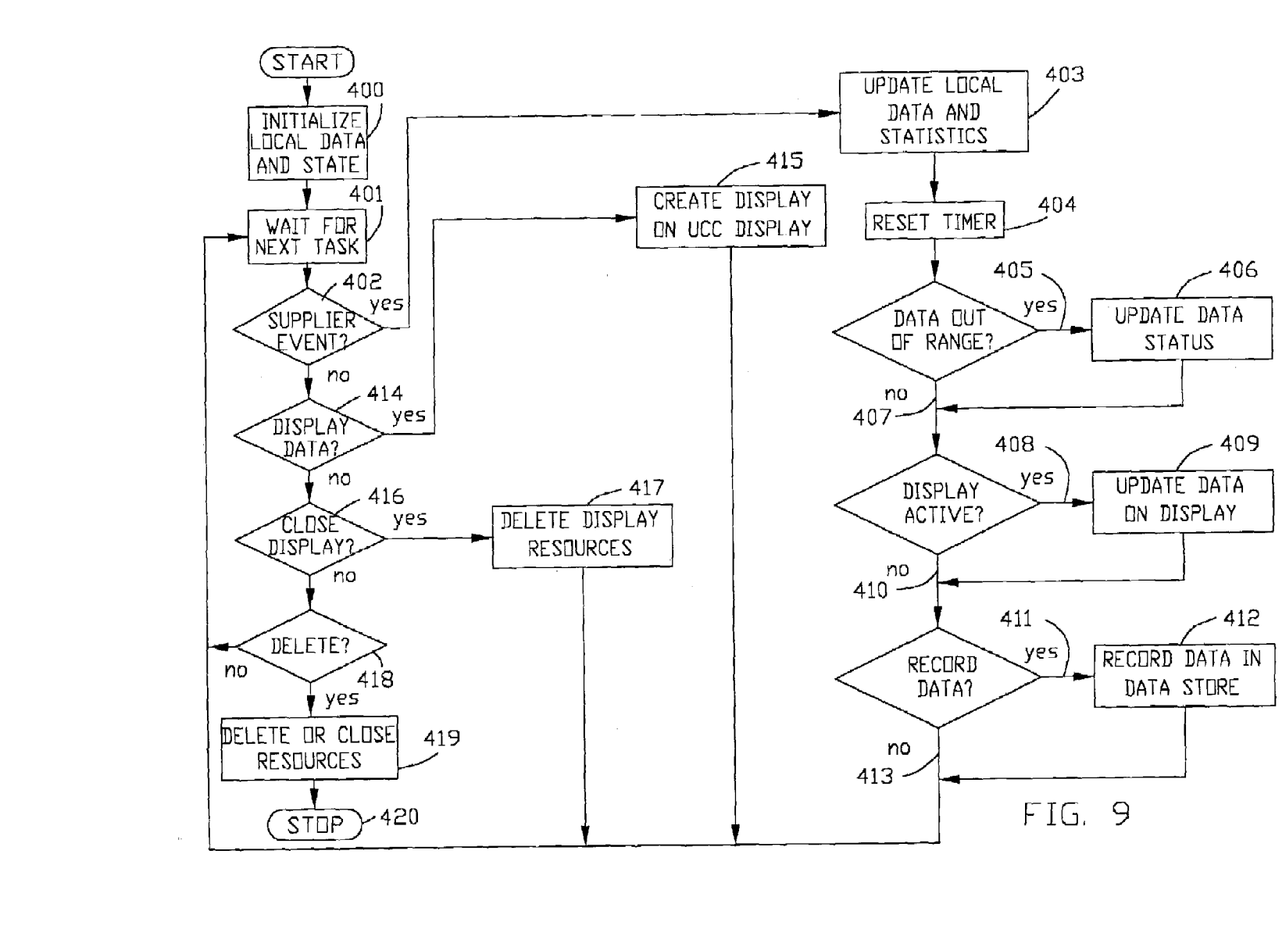
FIG. 9 shows the flow diagram for a Consumer Implementation.

Each Consumer Implementation 145 has the same flow diagram as shown in FIG. 9. In the first step, the Consumer Implementation 145 initializes local data and state 400 essentially clearing its local data store (not shown). Each Consumer Implementation 145 maintains its own local data store in random access memory that keeps track of the Consumer Implementation's 145 connection status and contains the data received by the Consumer Implementation 145 from the Supplier 80 it is interacting with.

The Consumer Implementation 145 then waits to perform a task 401. Upon receiving an EVENT 402 from the Supplier 80 it is connected to, the Consumer Implementation 145 updates its local data store with the data that it has received and updates the data latency statistics 403. It then resets its internal timer 404 and performs a range measurement on the data it received. If the data is out of range 405, the Consumer Implementation 145 notes the range error in its local data store 406. If the data is in range 407, then the Consumer Implementation 145 proceeds to the next step and check to determine if a data display window 120 is active. If the window 120 is active 408, then the Consumer Implementation 145 displays 409 the data it has received in the data display window 120 and proceeds to the next step. If the window 120 is not active 410, the Consumer Implementation 145 checks whether the record data option is active. The user has the option of instructing the Consumer Implementation 145 to record all of the data in its local data store in random access memory to a file in the Data Store 120. Where this option is active, the data is formatted and saved to the Data Store 120. If the record data option is active 411, the Consumer Implementation 145 records the data in its local data store to the Data Store 412 and proceeds to the next step. If the record option is not active 413, then the Consumer Implementation 145 proceeds to the next step, which is to wait for the next task 401.

When instructed by the Consumer Manager 170 to DISPLAY DATA 414, the Consumer Implementation 145 creates 415 a data display 120 on the UCC Display 60. In a preferred embodiment of the invention, when the user enters a Display Data command, the Consumer Implementation provides a MOTIF™ window on the GUI Display for the user. Once the display 120 is created, the Consumer Implementation 145 waits to receive instructions for its next task 401.

When the user enters a CLOSE DISPLAY command 416 the Consumer Implementation 145 destroys its active data display 120 and recovers all resources used to create it 417.

When the user enters a DELETE command 418 the Consumer Implementation 145 deletes or closes all resources 419 and terminates 420.

The UCC Display 60 has two primary types of displays as shown in FIG. 2. The first is the Control and Status Display 115 or GUI that is generated by the GUI Client 110, designed specifically for the UCC. The second type of display is the Data Display 120, which is generated directly from Client, and Consumer Implementations 140, 145 created by the Client Manager 165 and the Consumer Manager 170.

In a preferred embodiment of the invention, the Control and Status Display 115 is structured as a window or set of windows functioning with the MICROSOFT® WINDOWS® operating system. The GUI allows the user to select the Server 70 or Supplier 80 to be monitored by displaying all available Servers 70 and Suppliers 80 and displays connection status such as "CONNECTING," "NAME NOT FOUND," "DISCONNECTED". In a preferred embodiment, the Control and Status Display 115, consists of menus and displays from which the user can issue commands to the UCC CORBA Control 50. Through these menus, any of the various data sources can be selected individually or as a group, by some user specified basis. In one embodiment, the display window is divided according to category, reserving the top portion of the window for Suppliers 80, and the bottom for Servers 70. When a user selects a particular Server 70 or Supplier 80, the connection status and statistics are also displayed in the window as are connection logs and timing details when appropriate.

Data Displays 120 display the actual data being received by the various Client and Consumer Implementations 140, 145 from Servers 70 and Suppliers 80. In a preferred embodiment of the invention, the Data Display GUI is implemented using MOTIF™ widgets, and can actually display not only the data being received by the Implementations 140, 145 but also the IDL upon which the data is based on. When the Data Display 120 is activated, the display 120 initially consists of the various method signatures for the specific Server 70 or Supplier 80 IDL interface. In one embodiment of the display 120, the method signatures are color-coded and initially all of them are set to blue. The user, selects a method displayed in the Data Display 120 and invokes that method on a Server 70. If the invocation is successful, the method signature on the display 120 is turned Green to indicate success, whereas if the method invocation fails the method signature on the display 120 turns Red and an indication of the error is given in the status line at the bottom of the display 120. In another embodiment of the display 120, in the case of a method being invoked by the Supplier 80, a successful invocation is indicated on the screen by also setting the method signature color Green. The method signatures are reset to Blue by pressing Reset on the Menu bar.

The advantages of the present invention over the prior art are that: The Universal Client and Consumer provides a novel approach for assisting a software developer in validating the operations of and debugging any of the Servers and Suppliers in a CORBA based system during incremental integration of the system while avoiding the incorporation of additional performance-monitoring code into each Server/Supplier application. The method and apparatus provides significant advantages over prior art, in that the desired validation and debugging is done unobtrusively without having the Servers or Suppliers know that the information is being obtained by making use of existing available CORBA resources making it simpler and more efficient than the prior art.

What has thus been described is a method and apparatus that exploits existing CORBA resources for the purpose of validating the operation, functionality and performance of any of the Servers and Suppliers in a CORBA based distributed software system and provides a display of the current operational status of all the data sources in a computer network to a network user. The display graphically depicts the Server/Supplier availability for the entire system in real time through a graphical user interface viewable at any network video connection and allows the user to interact with Servers and Suppliers to verify the initialization of Servers and Suppliers as well as connectivity and data interactions between the Servers/Suppliers and Clients/Consumers, performance measurements such as the time to initialize, the time required for Servers to respond to Client invocation and the frequency rate of Suppliers providing data, and verification that data obtained from the Servers and Suppliers is within specified ranges.

Obviously many modifications and variations of the present invention may become apparent in light of the above teachings. For example, implementation and use of the invention could be tailored to a closed network as on a ship, or a widely disbursed network like the Internet. The colors on the GUI display may vary, as may the detailed status messages. The status data provided by the invention can then be provided to a system manager and integrated in with network status to provide a complete picture of both the system hardware and software.

In light of the above, it is therefore understood that within the scope of the appended claims, the invention may be practiced otherwise than as specifically described.

What is claimed is:

1. An apparatus for allowing a user to connect to and interact with a plurality of server processes and supplier processes in a distributed software system, comprising:
    an interface for displaying system information and providing command and control functions to the user, said interface comprising a graphical user interface client that creates and maintains a control and status display, and a plurality of data displays in a multi-window format;
    a controller, connected to said interface, that establishes connections to the server processes and supplier processes in the distributed software system by dynamically instantiating at least one specific Interface Definition Language client implementation that will connect to a corresponding server process and at least one specific Interface Definition Language consumer implementation that will connect to a corresponding supplier process, wherein said controller also manages the connections, and stores statistics and information on the connections, wherein said controller receives command and control functions from said interface and executes said functions, said controller further comprising:
    a control logic data distribution module that controls the creation and deletion of specific client and consumer implementations via a client manager and a consumer manager, wherein command and control functions are directed to the client manager to control interactions with the server processes in the system and the consumer manager to control the interactions with the supplier processes in the system, wherein said client manager creates, controls, and deletes the client implementations as requested by the user, wherein said consumer manager creates, connects, controls, and deletes the consumer implementations as requested by the user, wherein said control logic data distribution module executes user commands through the appropriate managers, wherein said user commands executed by the control logic data distribution module comprise requests to connect to a server or supplier, requests to disconnect from a server or supplier, requests for specific implementations to display their data, requests for timing details, requests to see connection status logs, requests to reset statistics, and request data statistics from a particular Implementation;
    a graphical user interface server that contains a Interface Definition Language interface implemented by the controller, wherein said graphical user interface server passes command and control functions and status data between said interface and said controller;
    a data store comprising a permanent magnetic storage medium that stores a plurality of data comprising at least one data file generated by said plurality of servers and suppliers, at least one connection and status log file that represent the status of connections between the client implementations and server processes and the consumer implementations and supplier processes, wherein said data is a series of files or a database stored on said permanent magnetic storage medium, wherein the data stored in the data store can be stored over extended periods of time and used for long-term statistical analysis;

at least one specific Interface Definition Language client implementation and at least one specific Interface Definition Language consumer implementation, wherein each implementation consists of at least one implementation of classes employing the same specific Interface Definition Language interfaces of said distributed software system, wherein an implementation is a client implementation when its specific Interface Definition Language interface allows it to connect to and perform invocations on a server process, and wherein an implementation is a consumer implementation when its specific Interface Definition Language interface allows it to register for events as required and receive invocations provided by a supplier process, wherein each client and consumer implementation maintains its own local data store in random access memory that tracks connection status data received from server processes and supplier processes;

wherein the statistics and information received from the controller are displayed by said interface in a graphical format on a video terminal in a first graphical display and a second graphical display, said first graphical display being a control and status display that is generated by a graphical user interface client, the second graphical display being a data display that is generated directly from client and consumer implementations said control and status display further comprising:

at least one window functioning with a process window based operating system consisting of a plurality of menus and displays from which the user can issue commands to the controller, wherein the user can select at least one data source through said plurality of menus, said at least one window being divided according to a category, wherein a top portion of said at least one window displays graphical information pertaining to supplier processes, and a bottom portion of said at least one window displays graphical information pertaining to server processes, wherein the user selects a server process and a supplier process to monitor from said at least one window displaying all available server process arid supplier processes, wherein said at least one window displays connection status such as "CONNECTING," "NAME NOT FOUND," "DISCONNECTED" wherein said at least one window displays connection logs and timing details when appropriate;

wherein said data display displays the actual data being received by the various client and consumer implementations from server processes and supplier processes, and displaying the data being received by the implementations and the Interface Definition Language upon which the data is based on, wherein upon activation, the data display initially consists of a plurality of method signatures for the specific server or supplier Interface Definition Language interfaces, said plurality of method signatures being color-coded.

* * * * *